(12) United States Patent
Brolley et al.

(10) Patent No.: US 8,578,275 B2
(45) Date of Patent: *Nov. 5, 2013

(54) APPLICATION RECOMMENDATION

(75) Inventors: Sarah Nelson Brolley, Raleigh, NC (US); Bernadette Alexia Carter, Raleigh, NC (US); Jessica Whitley Forrester, Raleigh, NC (US); Kathryn Jane Lemanski, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/422,115

(22) Filed: Mar. 16, 2012

(65) Prior Publication Data

US 2012/0179973 A1 Jul. 12, 2012

Related U.S. Application Data

(63) Continuation of application No. 12/917,380, filed on Nov. 1, 2010.

(51) Int. Cl.
*G06F 15/177* (2006.01)

(52) U.S. Cl.
USPC .......................................................... 715/738

(58) Field of Classification Search
USPC ............. 715/738; 709/224; 463/42; 705/26.7
See application file for complete search history.

(56) References Cited

U.S. PATENT DOCUMENTS

| | | | |
|---|---|---|---|
| 5,796,952 A * | 8/1998 | Davis et al. .................... 709/224 |
| 6,412,012 B1 * | 6/2002 | Bieganski et al. ............ 709/232 |
| 6,947,922 B1 * | 9/2005 | Glance .......................... 705/26.1 |
| 7,174,312 B2 * | 2/2007 | Harper et al. .................... 705/35 |
| 7,526,459 B2 | 4/2009 | Flinn et al. |
| 7,606,772 B2 | 10/2009 | Flinn et al. |
| 7,668,821 B1 * | 2/2010 | Donsbach et al. ............ 707/765 |
| 7,739,231 B2 | 6/2010 | Flinn et al. |
| 8,286,086 B2 * | 10/2012 | Sampson et al. .............. 715/760 |
| 2003/0083892 A1 * | 5/2003 | Ramachandran et al. ........ 705/1 |
| 2003/0083894 A1 * | 5/2003 | Bell et al. ............................ 705/1 |
| 2003/0181242 A1 * | 9/2003 | Lee et al. ......................... 463/42 |

(Continued)

FOREIGN PATENT DOCUMENTS

WO 2008144662 A1 11/2008

OTHER PUBLICATIONS

Song-et al.; "Real-time Automatic Tag Recommendation"; Google; Jul. 2008.

(Continued)

*Primary Examiner* — Phenuel Salomon
(74) *Attorney, Agent, or Firm* — Steven L. Nichols; Van Cott, Bagley, Cornwall & McCarthy P.C.

(57) ABSTRACT

A method for application recommendation performed by a computerized application recommendation system includes receiving usage data for applications within a category of applications from a plurality of users, and providing a first user with a recommendation for a first application in the category of applications based, at least in part, on a change in the usage data. A computerized application recommendation system includes a processor and a memory. The processor is configured to receive usage data for applications in a category of applications from a plurality of users, and provide a first user with a recommendation for a first application in the category of applications based, at least in part, on a change in the usage data.

16 Claims, 5 Drawing Sheets

(56) References Cited

U.S. PATENT DOCUMENTS

| | | | |
|---|---|---|---|
| 2004/0177025 A1* | 9/2004 | Spoonhower et al. | 705/37 |
| 2005/0289468 A1* | 12/2005 | Kahn et al. | 715/738 |
| 2006/0200432 A1* | 9/2006 | Flinn et al. | 706/12 |
| 2006/0200434 A1* | 9/2006 | Flinn et al. | 706/12 |
| 2006/0200435 A1* | 9/2006 | Flinn et al. | 706/12 |
| 2007/0174247 A1* | 7/2007 | Xu et al. | 707/3 |
| 2007/0203872 A1* | 8/2007 | Flinn et al. | 706/62 |
| 2008/0004941 A1 | 1/2008 | Calabria | |
| 2008/0052288 A1 | 2/2008 | Flinn et al. | |
| 2008/0104226 A1* | 5/2008 | Seshasai | 709/224 |
| 2008/0244413 A1* | 10/2008 | Sampson et al. | 715/738 |
| 2009/0006180 A1* | 1/2009 | Hameen-Anttila | 705/10 |
| 2009/0144075 A1* | 6/2009 | Flinn et al. | 705/1 |
| 2010/0223341 A1* | 9/2010 | Manolescu et al. | 709/206 |
| 2010/0250337 A1* | 9/2010 | Kassaei | 705/10 |
| 2011/0218840 A1* | 9/2011 | Margalit et al. | 705/7.35 |
| 2011/0296000 A1* | 12/2011 | Ferris et al. | 709/224 |

OTHER PUBLICATIONS

Schafer, JB.; "The Application of Data-Mining to Recommender Systems"; Google; 2003-2004.

Sheth-et al.; "weHelp: A Reference Architecture for Social Recommender Systems"; Google; 2009-2010.

Haar-et al.; "Social Media Usage Patterns—Measuring Business Adoption of YouTube, Facebook, LinkedIn & Twitter"; Google; Nov. 2009.

* cited by examiner

Instance 1
(300)

| User | Application A | Application B | Application C |
|---|---|---|---|
| User 1 (302-1) | 24 | 0 | 0 |
| User 2 (302-2) | 13 | 1 | 2 |
| User 3 (302-3) | 22 | 23 | 13 |

302, 304, 306, 308

Usage Metric (310)

Fig. 3A

Instance 2
(312)

| User | Application A | Application B | Application C |
|---|---|---|---|
| User 1 (302-1) | 22 | 0 | 0 |
| User 2 (302-2) | 7 | 16 | 5 |
| User 3 (302-3) | 18 | 37 | 12 |

APPLICATION RECOMMENDATION

RELATED APPLICATIONS

The present application is a continuation of and claimed priority under 35 U.S.C. §120 to U.S. application Ser. No. 12/917,380, filed Nov. 1, 2010, entitled "APPLICATION RECOMMENDATION," which is incorporated herein by reference in its entirety.

BACKGROUND

Aspects of the present invention relate in general to methods and systems for application recommendation, and more particularly, to allowing a user to automatically receive recommendations for applications based on shifts in application usage data collected from other users.

Users of physical computing devices such as laptop computers, desktop computers, and mobile smart phones regularly use a number of different computer applications for a variety of purposes. For example, a user may use word processing and email applications for business, music and video applications for entertainment, and various social networking applications for social purposes.

For a given application, there are often a wide range of alternative applications that can be used to perform the same functions. These alternatives may be generally similar but may differ in specific respects. Often times, a user may not particularly like an application he or she is using, but does not have the time to look for a satisfactory alternative. Additionally, a user may come upon a highly desired application, but does not have the time to inform his or her contacts of the newly discovered and possible superior application.

BRIEF SUMMARY

A method for application recommendation performed by a computerized application recommendation system includes, with the computerized application recommendation system, receiving usage data for applications within a category of applications from a plurality of users, and with the computerized application recommendation system, providing a first user with a recommendation for a first application of the category of applications based in part on a change in the usage data.

A computerized application recommendation system includes a processor and a memory communicatively coupled to the processor. The processor is configured to receive usage data for applications in a category of applications from a plurality of users, and provide a first user with a recommendation for a first application of the category of applications based in part on a change in the usage data.

A computer program product for providing a user with a recommendation to use a particular application, the computer program product includes a computer readable storage medium having computer readable code embodied therewith. The computer readable program code includes computer readable program code configured to receive usage data for applications in a category of applications from a plurality of users, and computer readable program code configured to provide a first user with a recommendation for a first application of the category of applications based in part on a change in the usage data.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

FIG. 3A is a diagram showing illustrative usage statistics at an instant before a shift in usage occurs, according to one embodiment of principles described herein.

FIG. 3B is a diagram showing illustrative usage statistics at an instant after a shift in usage occurs, according to one embodiment of principles described herein.

Throughout the drawings, identical reference numbers designate similar, but not necessarily identical, elements.

DETAILED DESCRIPTION

Figure 1:
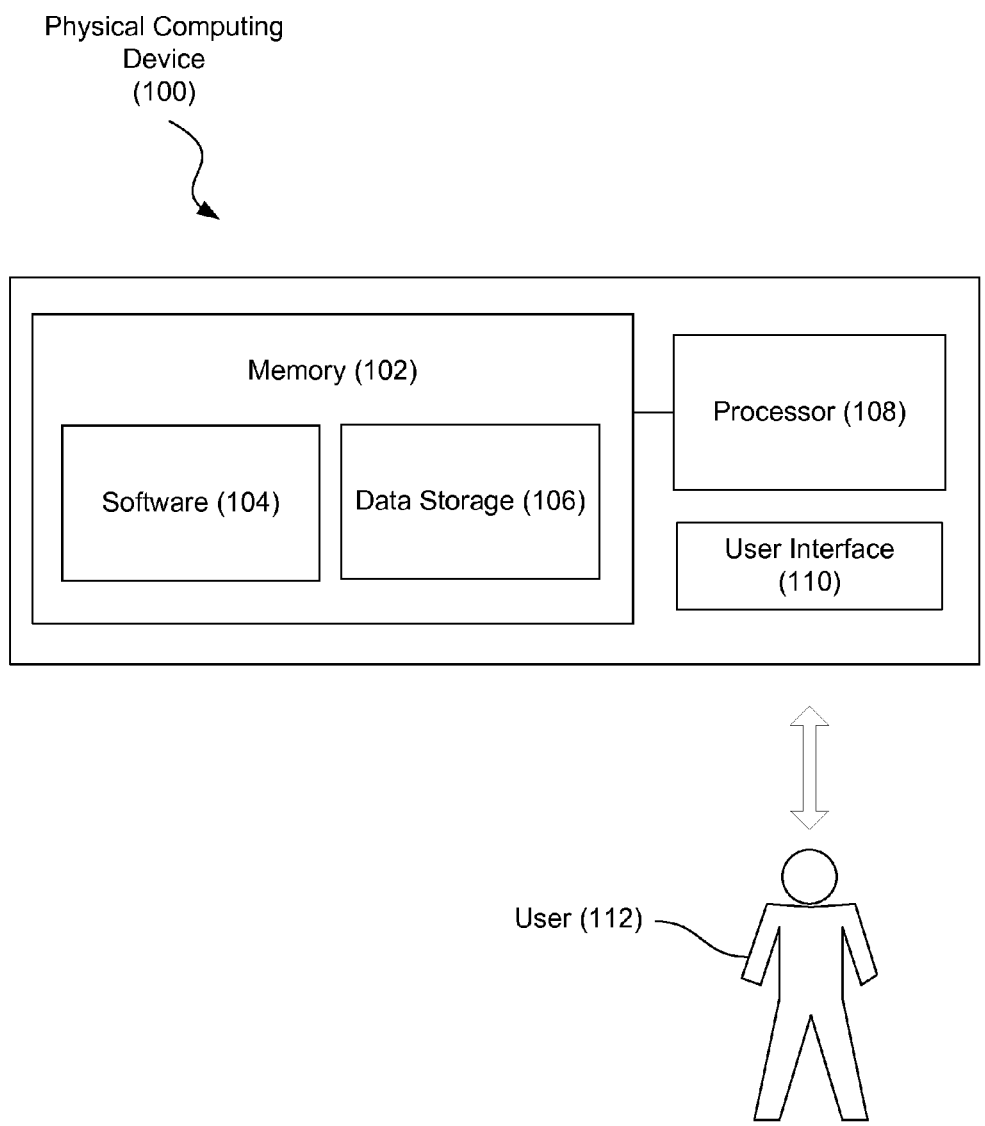
FIG. 1 is a diagram showing an illustrative physical computing system, according to one embodiment of principles described herein.

The present specification discloses methods and systems for allowing a user to automatically receive recommendations for applications based on shifts in usage data from other users. According to certain illustrative embodiments, a computerized application recommendation system receives and maintains usage data for a number of users within a predefined group. The usage data includes usage statistics for a number of applications within a number of different application categories. If the usage data indicates that a user has made a shift from using a first application within a particular category to a second application within that same category, then the other users within the same group may receive recommendations to use the second application. A group may be based on a social network, a professional network, or a geographical network. In some cases, a recommendation is given to other users if the usage data as a whole indicates a shift from use of one application to another. Various metrics, which will be described in detail below, can be used to determine whether a shift in usage data is significant enough to provide users with a recommendation for a new application.

Through use of systems and methods embodying principles described herein, a user may automatically receive application recommendations based on the usage statistics of other users. This prevents the user from having to look for new applications. Additionally, because recommendation are based on the activities of similar users, the recommendations are more likely to meet with the approval of the recommendation recipient. A group preference is indicated by the fact that a number of other users are starting to use the recommended application more than a previously used application. Additionally, a user who does find a new program particularly useful does not need to manually recommend it to others. Rather, his or her shift in usage to the new program within the same category may automatically trigger a recommendation to be received by other members of the group.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to the figures, FIG. 1 is a diagram showing an illustrative physical computing system (100) that may be used by a user to run applications. According to certain illustrative embodiments, the physical computing system (100) may include a memory (102) having software (104) and data (106) stored thereon.

There are many types of memory available. Some types of memory, such as hard disk drives, optical disc drives, and solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software (104) and data (106).

The physical computing system (100) also includes a processor (108) for executing the software (104) and using or updating the data (106) in the memory (102). The physical computing system (100) may be embodied as a variety of physical computing devices including, but not limited to, a laptop or tablet computer, a desktop computer, and a mobile device such as a smart phone or a Personal Digital Assistant (PDA).

A user interface (110) may provide a means for the user (112) to interact with the computing system (100). The user interface may include any collection of devices for interfacing with a human user (112). For example, the user interface (110) may be a touch-screen device that acts both as a display and as an input.

The physical computing system (100) may be configured to run a variety of different applications embodied as software (104). As mentioned above, these applications may be for a variety of different purposes. For each type of application, there are often a wide range of alternative applications that can be used to perform the same functions. These alternatives may be similar in basic respects but may differ in various features. Often times, a user may not particularly like an application he or she is using, but does not have the time to look for a satisfactory alternative. Additionally, a user may come upon a highly desired application, but does not have the time to inform his or her contacts of the newly discovered and perceivably superior application. In light of this and other issues, the present specification discloses a method for automatic recommendation of applications based on a shift in usage data acquired from other users.

Figure 2:
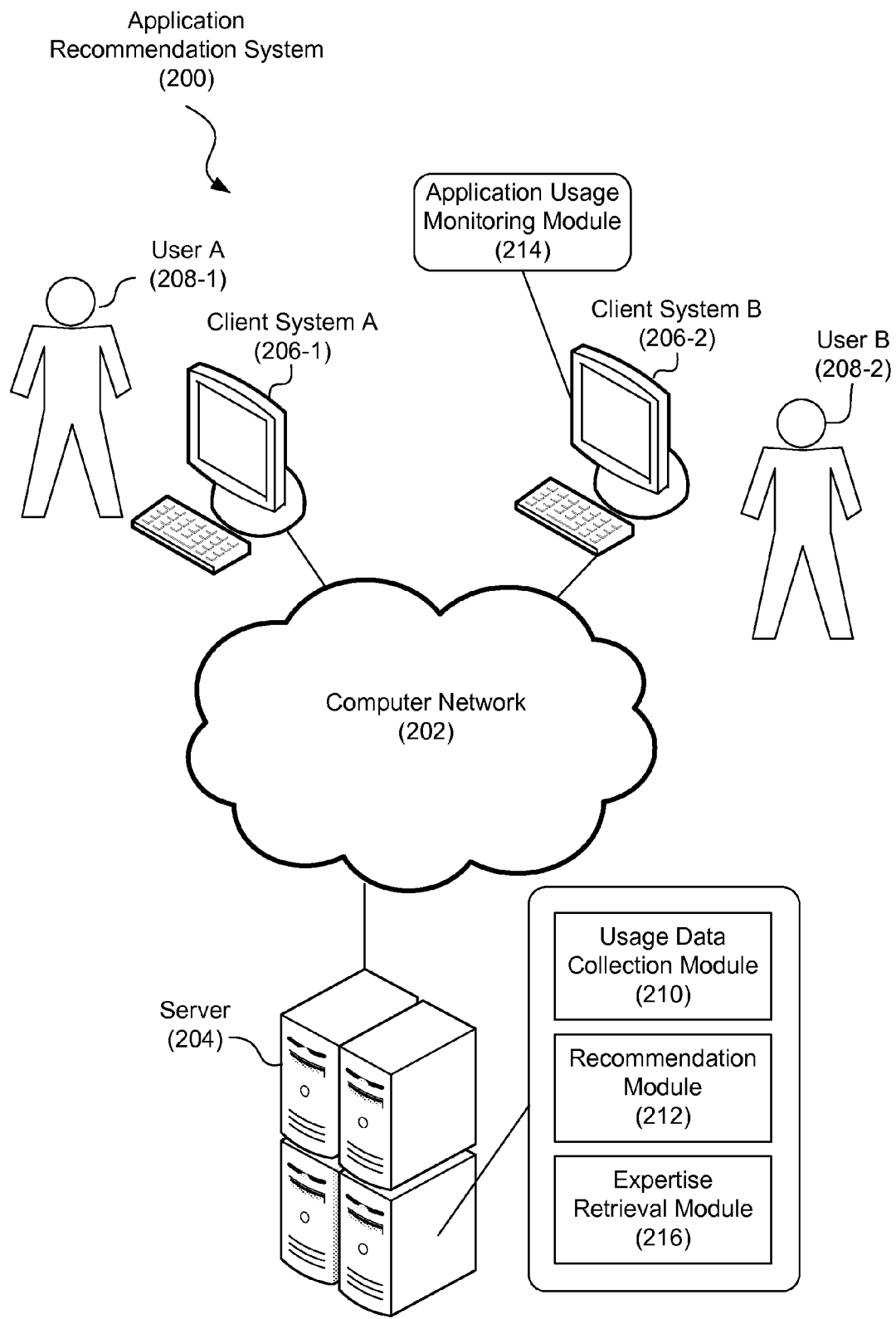
FIG. 2 is a diagram showing an illustrative network, according to one embodiment of principles described herein.

FIG. 2 is a diagram showing an illustrative network (202). Many physical computing systems are configured to be connected to a network (202). Through the network, physical computing systems may interact with a server (204). The physical computing systems are then often referred to as client systems (206). The client systems (206) can be configured to collect usage data based on the applications used by a particular user on that client system. The usage data can then be sent to a server. A data collection module (210) on the server (204) can then be used to process the usage data. A recommendation module (212) can then provide recommendations to other users based on changes in the usage data.

In one example, a user's (208) client system (206) can include an application usage monitoring module (214). This application usage monitoring module (214) can monitor the use of other applications on the same client system (206). The type of application usage monitored may include, for example, which applications the user downloads and installs, how often a user executes an application or how often a user actively interacts with the application. The application usage monitoring module (214) can then send the data to a remote server (204).

In some cases, a particular application may be used for different purposes. The application usage monitoring module (214) can be configured to distinguish between different uses of the application. For example, the application monitoring module (214) may distinguish between music files and video files played on a media player application. If users shift to using a new application for video files but continue to use the original application for media files, the associated recommendation based on this shift may specify that the new application is good for video files.

The usage data collection module can be configured to receive data from the client systems (206) relating to usage data. The usage data collection module (210) may then compile the data into a form that allows for analysis. The usage data collection module (210) can be configured to monitor different types of applications. For example, a common type of application is a web browser. A web browser is also used to access web applications. Furthermore, web browsers are often fit with a variety of plug-ins. A plug-in is a smaller piece of software that adds features or capabilities to a larger piece of software. The application recommendation system can monitor web applications and plug-ins to determine how often those applications or plug-ins are used.

The recommendation module (212) performs analysis on the data collected by the usage data collection module (210) and determines if a recommendation should be made based on changes in the usage data. For example, if the recommendation module (212) determines that one or more users have shifted usage from a particular application to a different and similar application, then the recommendation module (212) can provide recommendations to other users based on that shift. In some cases, the recommendations are only made to those who are part of the same group of users from where the usage statistics were derived. In some cases, a recommendation may be made when any one user in the group starts using another application. In other cases, a recommendation is not made until a minimum threshold number of users in the group begin using the same new application. In other cases, the recommendation may not be made until a user has continued using the new application for some minimum threshold period of time or has launched and used the new application some minimum threshold number of times. Any such combination of criteria can be used to control when a recommendation is or is not made.

The server also includes an expertise retrieval module (216). The expertise retrieval module (216) determines the expertise of a particular user regarding a particular category of application. This information may be retrieved, for example, from a social networking application. Such applications can include information about a person and how other users perceive that person's expertise relating to a particular category of applications. The perceived expertise information may also be retrieved from other sources including, but not limited to, email, chat program logs, and content repositories.

In one example, a particular user may be an experienced photo editor and have a lot of experience using photo editing applications. In this case, if such a user were to make a shift to a new photo editing application, then that user's shift would be given more weight than a user who rarely uses photo editing software in terms of deciding whether to issue a recommendation for the new photo editing application.

In one illustrative example, user A (208-1) regularly uses a particular word processor. However, user A (208-1) decides to try using a new word processor. User A (208-1) develops a preference for the new word processor application and increases the usage of the new word processor application while decreasing the usage of the old word processor application. The usage data for these two word processing applications are sent to the usage data collection module (210) of the server (204).

When the recommendation module (212) performs analysis on this data, it may determine that there is a shift in usage data from the old word processing application to the new word processing application by user A (208-1). The recommendation module (212) then provides a recommendation to other users within the same network as user A (208-1). This network may be social, professional, or geographic. User B, who is within the same network as user A (208-1) then receives a recommendation to use the new word processing application. User B (208-2) can then decide whether or not to try the new word processing application.

FIGS. 3A and 3B illustrate usage data at two different instances. FIG. 3A is a diagram showing illustrative usage statistics at an instant before a shift in usage occurs. As mentioned above, an application monitoring application can monitor the usage of a number of applications used by a number of users (302). In this example, application A (304), application B (306), and application C (308) are all within the same category of application. Additionally, user 1 (302-1), user 2 (302-2), and user 3 (302-3) are all in the same associating network.

Each user can be assigned a usage metric (310) for each application. The usage metric may take into account a variety of factors relating to the use of an application. For example, the usage metric may measure usage in part by how many times a user opens an application. In the case of a web application, the usage metric may be based in part on how many times the user accesses the application through a web browser. In the case of a plug-in application, the usage metric may take into account how often the user performs an action that causes the plug-in to operate or perform particular functions. Furthermore, in the case of a music player, the application may run in the background for long periods of time but require very little user interaction. Thus, the application recommendation system may monitor different applications in a different manner. In general, a greater usage metric number for a particular application and user indicates a greater usage of that application by that user.

The table in instance 1 (300) shows that user 1 (302-1) uses application A (304) and does not use application B (306) and application C (308). User 2 (302-2) uses application A (304) as well as application B (306) and application C (208). However, user 2 (302-2) uses application A (304) more than application B (306) and application C (308). Furthermore, user 3

(302-3) uses application A (304) and application B (306) relatively equally and more often than application C (308).

FIG. 3B is a diagram showing an illustrative usage statistics at an instant after a shift in usage occurs. The table at instance 2 (312) shows that user 1 (302-1) still uses application A (304). However, user 2 (302-2) now uses application B (306) more than application A (304). User 3 (302-3) also now uses application B (306) more than application A (304).

In light of the above described shift in usage data from application A to application B, the application recommendation system may provide a recommendation to user 1 (302-1). The recommendation may be to switch to using application B (304). User 1 (302-1) may then decide whether or not to start using application B (304). In some cases, user 1 (302-1) may already have used application B (306) but has chosen to discontinue use of it for various reasons. When user 1 (302-1) receives a recommendation indicating that others within his or her associating network are using application B (306), user 1 (302-1) may be more willing to start using application B (306).

Any of the data collected supporting the recommendation may also be provided with the recommendation so that the recipient can use that data in deciding whether to accept the recommendation. For example, the recommendation may specify which other users have switched to the new application within the group, how long or how much they have been using the new application, etc. Privacy controls may also be implemented such that a user must approve any such information about his or her application usage being specifically disseminated with a recommendation to other members of the group.

Figure 4:
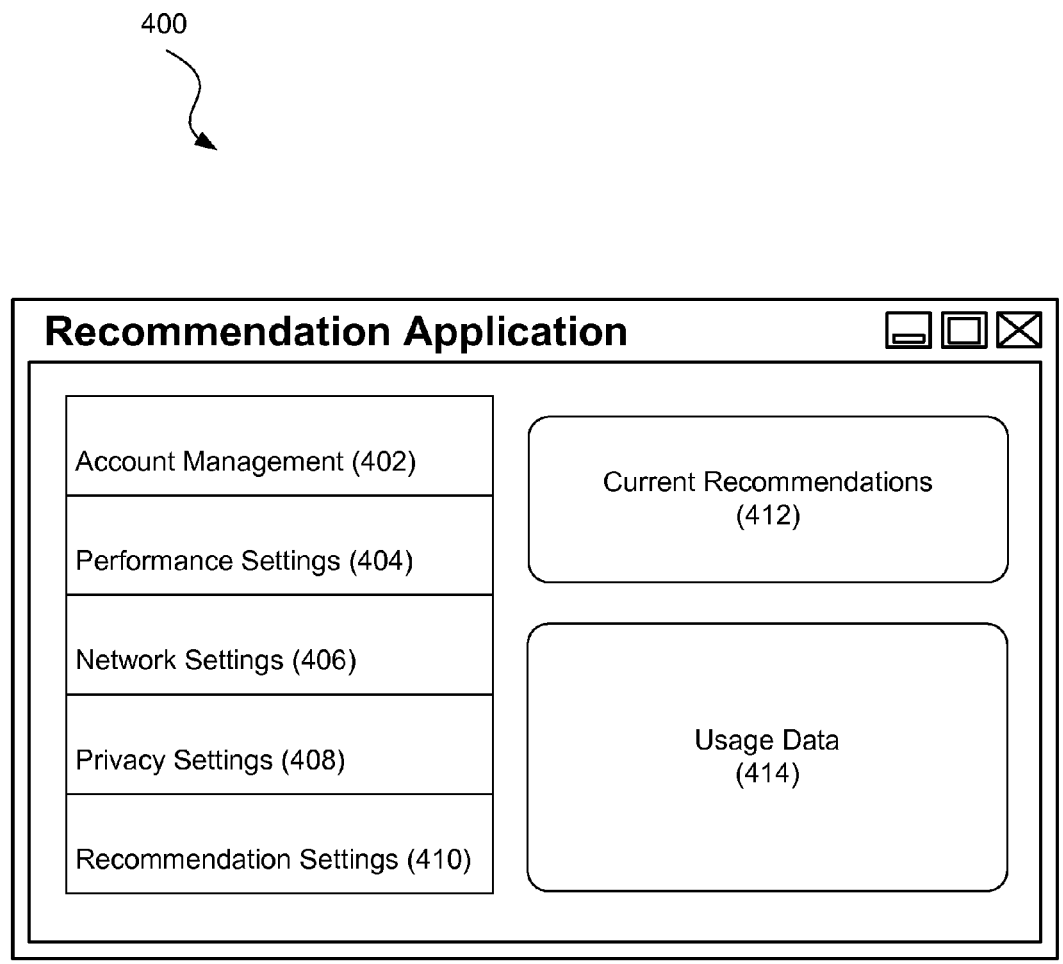
FIG. 4 is a diagram showing an illustrative user interface for a recommendation application, according to one embodiment of principles described herein.

FIG. 4 is a diagram showing an illustrative user interface for an application recommendation system. According to certain illustrative examples, an application recommendation application may include a window that provides a user with a number of options. These options may include account management (402), performance settings (404), network settings (406), privacy settings (408), and recommendation settings (410). The window may also display current recommendations (412) and usage data (414) from other users.

The account management (402) feature can allow a user to make changes to his or her account settings. A user may have an account with the recommendation system that may be accessed from a number of machines. For example, a user may access the recommendation system from a desktop computer, a laptop computer or a mobile phone. As long as the machine being used by the user is tied to the user's account, the application recommendation system can associate application usage to the user rather than to a particular machine. This account may require a username and password that can be managed through the account management (402) feature.

The performance settings feature (406) can allow a user to indicate how often and by what mode data should be sent from the client system to a server. For example, the user may specify that data is to be sent at non-peak times such as in the middle of the night. The user may also specify how often data should be sent such as daily or weekly. The user may also control how much bandwidth should be devoted to uploading the usage data to the server.

The network settings feature (406) can allow a user to manage his or her associating networks. For example, a user may wish to share usage data with friends within a particular social network. In this case, the application recommendation system can interface with a social networking site to associate users within the application recommendation system. In one example, a user will only receive recommendations based on changes in usage data from his or her friends within the indicated social network. A user may also choose to receive recommendations from a professional network such as a company network. In this case, the user may receive application recommendations based on changes in usage data from coworkers. A user may also choose to receive recommendations based on changes in usage data collected from other users within a particular geographical area.

The privacy settings feature (408) can allow a user to control privacy issues such as which applications are monitored for usage and how often usage is sent from a client system to a server. The user may also choose whether or not to associate his or her identity with particular usage data. In some cases, the privacy settings may be passive. Passive privacy settings may be configured to collect data from all applications except for applications that are blocked by the application recommendation system. In some cases, privacy settings may be active. Active privacy settings can be configured to only monitor applications that the user has specifically indicated. Additionally, data may be sent to the server only when permitted by the user.

The recommendations settings feature (410) may allow the user to control how and when recommendations are received. For example, a user may prefer that recommendations are received upon opening an application within the category of applications for which the recommendation was received. Additionally or alternatively, the user may prefer to receive the recommendation through an email.

The window can display recent recommendations (412) that the user has received. If the user has opted not to receive recommendations through any other means, the user may view the recommendations through this feature. The user may also get more detail on recommendations. For example, the user may look at the usage data (414) which prompted the recommendation. This may give the user a better idea of who is starting to use the recommended application more than a previous application.

Figure 5:
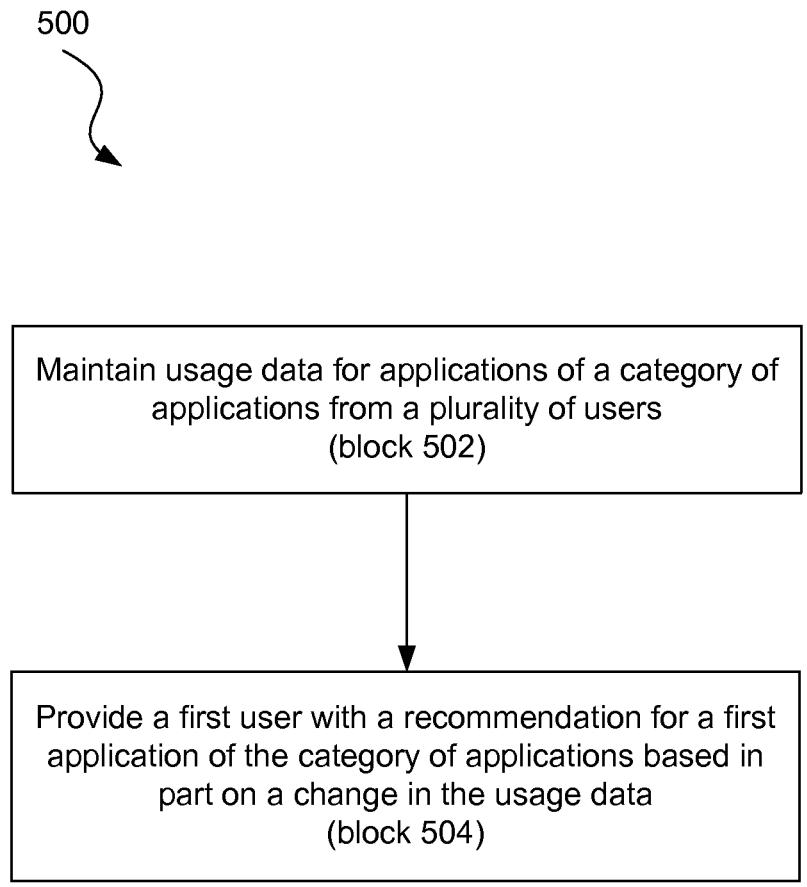
FIG. 5 is a flowchart showing a method for automatic recommendation of an application, according to one embodiment of principles described herein.

FIG. 5 is a flowchart showing a method for automatic recommendation of an application. According to certain illustrative examples, the method includes receiving (block 502) usage data for applications in a category of applications from a plurality of users, and providing (block 504) a first user with a recommendation for a first application of the category of applications based in part on a change in the usage data.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for application recommendation performed by a computerized application recommendation system, the method comprising:
   with said computerized application recommendation system, receiving usage data for applications within a category of applications from a plurality of users;
   with said computerized application recommendation system, providing a first user with a recommendation for a first application in said category of applications based, at least in part, on a change in said usage data;
   with said computerized application recommendation system, receiving from a number of said plurality of users input indicating whether or not the usage data associated with any one of said applications is to be included in said usage data;
   with said computerized application recommendation system, providing a number of said plurality of users with an option to control whether each of their identities are associated with the usage data;
   in which said usage data is provided to said first user and includes data indicating which users from among the plurality of users began using said first application and what usage data prompted the recommendation to be received by said first user; and
   in which said change in said usage data comprises a shift in average usage to said first application from a second application in said category by said plurality of users.

2. The method of claim 1, wherein said usage data is weighted based on an expertise of at least one of said plurality of users.

3. The method of claim 2, wherein said expertise is retrieved from a social networking application.

4. The method of claim 1, wherein said change in said usage data comprises a shift of usage by a second user from a second application of said category to said first application.

5. The method of claim 4, wherein more weight is given to a shift by users within a same network as said first user.

6. The method of claim 1, wherein said plurality of users belong to at least one of: a social network and a professional network.

7. The method of claim 1, wherein said usage data comprises at least one of: frequency of use of applications within said category of applications and duration of use of applications within said category of applications.

8. The method of claim 1, wherein said first application comprises one of: a standalone application and a web application.

9. The method of claim 1, further comprising, with said computerized application recommendation system, providing the first user with an option to control from which of a number of networks the recommendation for a first application is received.

10. The method of claim 1, in which recommendations for said first application are received when said first user opens an application in said category of applications.

11. A computer program product for recommending applications to a user, the computer program product comprising:
   a computer readable storage device comprising computer usable program code embodied therewith, the computer usable program code comprising:
      computer usable program code to, when executed by a processor, receive usage data for applications within a category of applications from a plurality of users;
      computer usable program code to, when executed by a processor, provide a first user with a recommendation for a first application in said category of applications based, at least in part, on a change in said usage data;
      computer usable program code to, when executed by a processor, receive from a number of said plurality of users input indicating whether or not the usage data associated with any one of said applications is to be included in said usage data;
      computer usable program code to, when executed by a processor, provide a number of said plurality of users with an option to control whether each of their identities are associated with the usage data;
   in which said usage data provided to said first user comprises information describing to said first user who from among said plurality of users began to use said first application in said category of applications and what usage data promoted said first user to receive said recommendation for said first application; and
   in which said change in said usage data comprises a shift in average usage to said first application from a second application in said category by said plurality of users.

12. The computer program product of claim 11, further comprising computer usable program code to, when executed by a processor, weight said usage data based on an expertise of at least one of said plurality of users.

13. The computer program product of claim 11, in which said expertise is retrieved from a social networking application.

14. The computer program product of claim 11, further comprising computer usable program code to, when executed by a processor, provide the first user with an option to control from which of a number of networks the recommendation for a first application is received.

15. The computer program product of claim 11, wherein said change in said usage data comprises a shift of usage by a second user from a second application of said category to said first application.

16. The computer program product of claim 11, wherein more weight is given to a shift by users within a same network as said first user.

* * * * *